United States Patent [19]

Baynes et al.

[11] Patent Number: 5,050,577
[45] Date of Patent: Sep. 24, 1991

[54] PRE-ASSEMBLED GAS BARBEQUE GRILL

[75] Inventors: William R. Baynes; Henry C. Schubert, both of Perry County, Ill.; Arlen Ferguson, Shelby County, Tenn.

[73] Assignee: Charmglow Industries, Inc., DuQuoin, Ill.

[21] Appl. No.: 526,373

[22] Filed: May 21, 1990

[51] Int. Cl.⁵ .............................................. F24C 1/16
[52] U.S. Cl. .................................. 126/9 R; 126/41 R
[58] Field of Search .................... 126/25 R, 41 R, 9 R

[56] References Cited

U.S. PATENT DOCUMENTS

| | | | |
|---|---|---|---|
| 3,179,104 | 4/1965 | Chapman et al. | 126/9 |
| 3,200,806 | 8/1965 | Goldstein | 126/25 |
| 3,297,016 | 1/1967 | Rhodes | 126/25 |
| 3,297,017 | 1/1967 | Levin | 126/25 |
| 3,421,493 | 1/1969 | Miller | 126/25 |
| 3,452,736 | 7/1969 | Harff et al. | 126/25 |
| 3,478,733 | 11/1969 | Meyerhoefer | 126/9 |
| 3,489,131 | 1/1970 | Richins | 126/9 |
| 3,556,076 | 1/1971 | Stewart | 126/9 |
| 3,593,701 | 7/1971 | Youmans | 126/25 |
| 4,453,529 | 6/1984 | Spencer | 126/9 |
| 4,624,238 | 11/1986 | Hait | 126/9 |
| 4,667,652 | 5/1987 | Bunton | 126/41 R |
| 4,677,964 | 7/1987 | Lohmeyer et al. | 126/41 R |
| 4,718,399 | 1/1988 | Shepherd | 126/25 R |
| 4,729,364 | 3/1988 | Dailey | 126/41 R |
| 4,741,321 | 5/1988 | Squires | 126/9 |
| 4,895,131 | 1/1990 | Overholser | 126/25 R |
| 4,924,846 | 5/1990 | Peacock et al. | 126/47 R |
| 4,949,701 | 8/1990 | Krosp et al. | 126/41 R |

Primary Examiner—Carroll B. Dority
Attorney, Agent, or Firm—Polster, Polster and Lucchesi

[57] ABSTRACT

A gas barbeque grill is constructed in a pre-assembled condition and positioned in a shipping carton. A liquid propane (LP) tank is also positioned in the shipping carton at one end. Following purchase, the tank is removed from the shipping carton, without removing the grill, for filling prior to arrival at the user's home. The pre-assembled grill is thereafter removed from the shipping carton for set-up at the user's home including attachment of the filled tank to the grill for immediate operation of the grill, after set-up of same. The grill is removed from the shipping carton by placing spaced leg supports for the grill on a supporting surface and lifting the shipping carton up and away from the grill. Leg supports preferably constitute four spaced leg supports arranged in a rectangular pattern for supporting the grill. The grill is pivotally mounted proximate an upper end of two spaced leg supports along one side of and within the rectangular pattern of four spaced leg supports. This enables the grill to be suspended from the two spaced leg supports in a lower pivot position between the four leg supports during shipping. During set-up at the user's home, the grill is pivoted to an upper horizontal position and secured to the two other leg supports also proximate an upper end thereof in general horizontal alignment with the pivotal mounting on the other leg supports. The grill is thus maintained in a stable and secure horizontal position during operation and use.

20 Claims, 5 Drawing Sheets

PRE-ASSEMBLED GAS BARBEQUE GRILL

CROSS REFERENCE TO RELATED PATENT APPLICATIONS

This application relates to copending patent application Ser. No. 07/529,473 filed on the same date, entitled METHOD OF SHIPPING AND SET-UP OF PRE-ASSEMBLED GAS BARBEQUE GRILL, assigned to a common assignee.

BACKGROUND OF THE INVENTION

The present invention relates to a pre-assembled barbeque grill to minimize consumer assembly while facilitating quick, convenient and efficient use of the gas barbeque grill.

Anyone that has ever used a gas barbeque grill is appreciative of the time saving and convenience that results in lighting and using the grill. In addition, there is very little waiting time for the grill to heat-up, and the time and effort required for grill clean-up is less than charcoal barbeque grills.

On the other hand, assembly of gas barbeque grills has been a frustrating and time consuming experience. Complicated parts list and assembly instructions, even when specifically followed, have nonetheless been frustrating and have involved a great deal of time and effort. Charcoal barbeque grills have eliminated this problem because they are generally shipped pre-assembled. Until the present invention, a pre-assembled gas barbeque grill has not been considered a practical option.

The present invention is, therefore, an improvement over the deficiencies of the prior art through the development of a pre-assembled gas barbeque grill including the method of shipping and setting-up the pre-assembled grill.

SUMMARY OF THE INVENTION

Among the several objects and advantages of the present invention include:

The provision of a gas barbeque grill which overcomes all of the deficiencies of prior art devices, while retaining all of the inherent advantages of gas barbeque grills;

The provision of the aforementioned gas barbeque grill which is pre-assembled so as to facilitate assembly and use by the consumer, without the time consuming and frustrating experience of grills that are not pre-assembled;

The provision of the aforementioned pre-assembled gas barbeque grill which can be quickly and easily assembled in a short number of steps, thus enabling the user to operate the grill in a relatively short period of time;

The provision of the aforementioned pre-assembled gas barbeque grill which is also constructed to be efficiently stored in a shipping carton in its pre-assembled condition, with all component parts positioned adjacent to and within the grill itself;

The provision of the aforementioned barbeque grill including leg support means attached to and supporting a grill housing, the grill housing being movable to a collapsed position relative to said leg support means for shipping and also being movable to an extended position relative to said leg support means during operation and use of the barbeque grill;

The provision of the aforementioned pre-assembled gas barbeque grill which is pivotally mounted proximate an upper end of two spaced leg supports along one side of and within a rectangular pattern of four spaced leg supports for the grill, thereby enabling the grill to be suspended in a lower pivot position between the four leg supports during shipping, and therefore enabling the grill to be subsequently pivoted to an upper horizontal position and secured to the two other leg supports during set-up, in order to maintain the grill in a stable and secure horizontal position during operation and use thereof;

The provision of the aforementioned pre-assembled gas barbeque grill which includes a liquid propane tank also positioned inside the grill shipping carton at one end thereof, so as to enable the tank to be easily removed and filled by a user without removing the grill from the shipping carton;

The provision of the aforementioned pre-assembled gas barbeque grill including fold down shelves that are capable of being opened to extend in a substantially horizontal position, and a warming rack within the grill which is maintained in a horizontal position during opening and closing of a domed cover overlying the heating chamber of the grill; and The provision of the aforementioned pre-assembled gas barbeque grill which is constructed to be user-friendly for assembly, operation and use; is capable of being mounted on wheels for easy transport thereof to desirable cooking locations or for storage; is constructed to be durable and long lasting use; and is otherwise well adapted for the purposes intended.

Briefly stated, the gas barbeque grill of the present invention is constructed to be pre-assembled and positioned in a shipping carton. A liquid propane tank is also positioned in the shipping carton at one end thereof. The tank is capable of being removed from the shipping carton without removing the grill for filling the tank by a user prior to arrival at the user's home. The pre-assembled grill is thereafter removed from the shipping carton for set-up at the user's home including attachment of the filled tank to the grill for immediate operation of the grill after set-up of same.

The barbeque grill preferably includes four spaced leg supports arranged in a rectangular pattern for supporting the grill. The grill is pivotally mounted proximate an upper end of two spaced leg supports along one side of and within the rectangular pattern of four spaced leg supports. This enables the grill to be suspended from the two spaced leg supports in a lower pivot position between the four leg supports during shipping. The grill is subsequently pivoted to an upper horizontal position and secured to the two other leg supports also proximate an upper end thereof and in general horizontal alignment with the pivotally mounted leg supports. This enables the grill to be maintained in a stable and secure horizontal position during operation and use of the grill.

For shipping purposes, the four spaced leg supports, with the included grill suspended in a lower pivot position within the leg supports, are positioned inside a shipping carton. The liquid propane tank is also positioned inside the shipping carton within the leg supports at one end of the shipping carton. This enables the tank to be easily removed and filled by a user without removing the grill from the shipping carton. The barbeque grill may be removed from the shipping carton by placing lower ends of the four leg supports on a supporting surface and lifting the shipping carton up and away from the grill.

Adjacent pairs of leg supports on opposite sides of and along the front of the grill are provided with shelves that are constructed to fold down in proximity to the leg supports during shipping and storing the grill. The shelves are also opened up to a horizontal position extending generally transverse to the leg supports for supporting various products used during grilling.

The shipping carton is filled with other component parts of the grill in the empty spaces of the shipping carton within the four spaced leg supports and also inside the suspended grill.

Preferably, the two spaced leg supports to which the grill is pivotally mounted are located along one long side of the rectangular pattern of four spaced leg supports. The grill is secured to the two other leg supports by a pin which extends through aligned openings in each other leg support and part of the grill on opposite sides thereof. Specifically, the grill is supported by an elongated strut on at least two opposite sides. One end of each elongated strut is pivotally mounted to one of the leg supports for pivotally mounting the grill and the other end of each elongated strut is secured to one of the two other leg supports by a pin which extends through aligned openings in each other leg support and one of the elongated struts.

The elongated struts on at least two opposite sides of the grill are interconnected to one another by a transverse strut extending therebetween and connected to the grill. Such transverse strut extends along the front of the grill and includes controls for operating the flow of gas to a gas burner contained within the grill.

The grill further includes a warming rack that is pivotally mounted to a domed cover of the grill and the grill heating chamber. Specifically, the warming rack includes a grid section pivotally mounted adjacent one side thereof to the dome cover and pivotally mounted along an opposite side to a swinging bar at its upper end. The swinging bar is also being pivotally mounted at its lower end to the heating chamber so as to maintain the grid section in a horizontal position during both opening and closing of the domed cover relative to the heating chamber.

These and other objects and advantages of the present invention will become apparent from the following description.

BRIEF DESCRIPTION OF THE DRAWINGS

In the drawings.

Corresponding reference numerals will be used throughout the various figures in the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Figure 1:
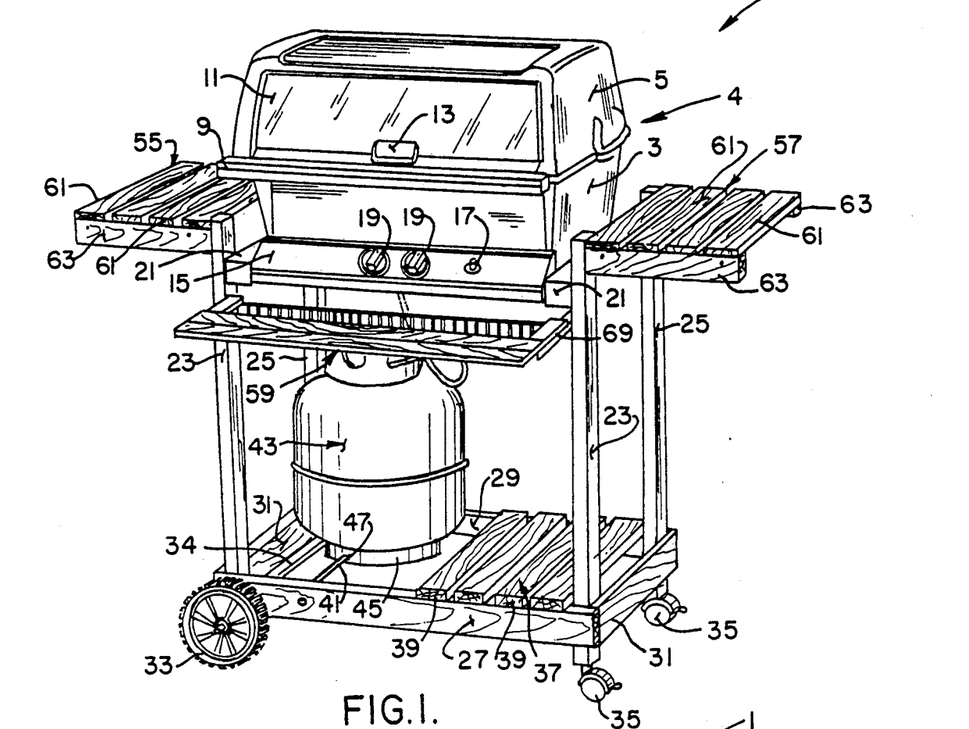
FIG. 1 is a front perspective view of the pre-assembled gas barbeque grill, when fully assembled for operation and use, with supporting shelves opened up and extending in a horizontal position, for supporting various products used during grilling.
Figure 2:
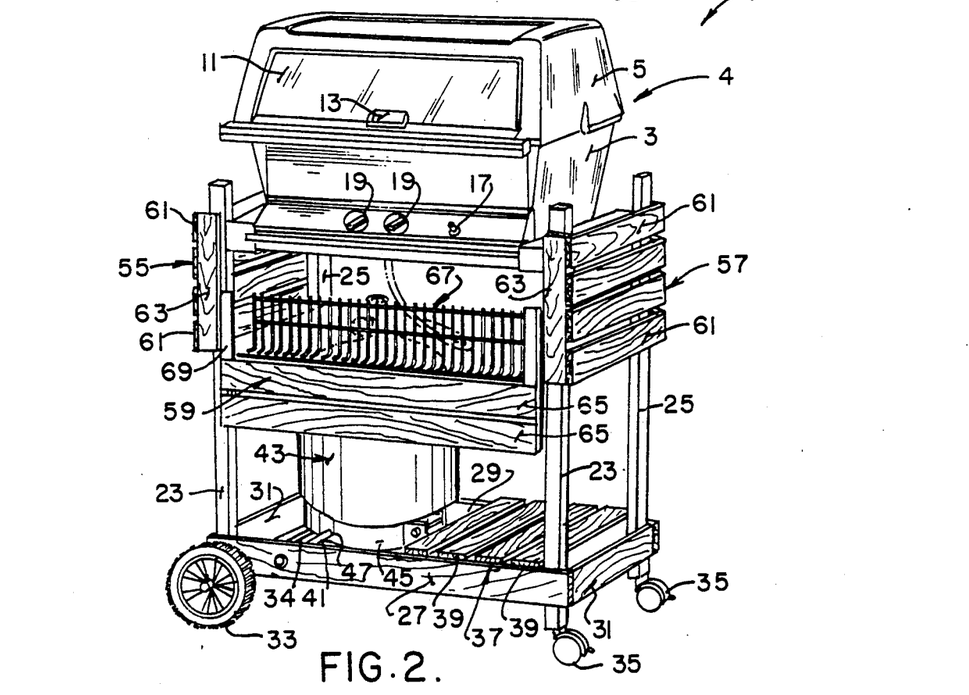
FIG. 2 is a front perspective view of the pre-assembled barbeque grill, also when fully assembled, but showing the supporting shelves folded down in a collapsed position for storage during non-use of the grill.

The fully assembled gas barbeque grill 1 shown in FIGS. 1-2 of the drawings is the final product for operation and use by the consumer. To arrive at the fully assembled gas barbeque grill 1 shown in FIGS. 1-2, various steps for packing the pre-assembled gas barbeque grill 1, including the assembly of several related components to the grill as, shown in FIGS. 3-21 of the drawings will be described in detail hereafter.

The fully assembled gas barbeque grill 1 shown in FIGS. 1-2 of the drawings includes the lower receptacle heating chamber 3 and a complementary or matching domed cover 5, which are pivotally attached to one another along the rear of the grill at 7, 7 (see FIG. 10) and form the grill housing 4. The dome cover 5 includes an elongated wood handle 9 secured to the front face thereof for opening and closing the domed cover 5 relative to the heating chamber receptacle 3. The domed cover 5 further includes a tempered glass window 11 for viewing the interior of the grill during cooking as well as a temperature gauge 13. Along the front face of the heating chamber receptacle 3 is a panel member 15 which is attached to receptacle 3 and also serves as a transverse strut member. The panel member 15 contains ignitor and burner controls 17, 19 respectively, for igniting the gas grill and for operating same at a high, medium or low temperature, as is well known.

A pair of elongated struts 21, 21 are attached to opposite sides of the heating chamber receptacle 3 and are interconnected to one another along the front face of the grill by the panel or strut member 15. Each of the elongated struts 21, 21 on opposite sides of the receptacle 3 are attached to four leg supports including front leg supports 23, 23 along the front of the grill and rear leg supports 25, 25 along the rear of the grill. The leg supports are preferably constructed from 1¼" hollow metal square tubes, as shown. Each of the four leg supports 23, 23 and 25, 25 are arranged in a rectangular pattern for receiving the generally rectangular shaped in cross section receptacle 3 and the or complementary or matched domed cover 5. At the bottom of the four leg supports 23, 23 and 25, 25, there is provided front and rear wood rails or struts 27, 29 and interconnecting side wood struts 31, 31 which structurally support and secure the front and rear leg supports 23, 23 and 25, 25, respectively, at the lower end of the grill.

A pair of wheels 33, 33 are mounted on an axle 34 which extends through the front and rear elongated wood struts 27, 29. A pair of casters 35, 35 are positioned in the lower open end of the hollow metal front and rear leg support 23, 25 on an opposite side of the grill 1 from the wheels 33, 33. As will be apparent, the rolling wheels 33, 33 and casters 35, 35 enable the grill 1 to be moved to whatever location is desired.

Extending across the front and rear wood rails or struts 27, 29 is a bottom shelf assembly 37 including a series of wood slats 39 which extend between the front and rear rails or struts 27, 29 for supporting various cooking items or utensils that may be used with the grill I. Also extending across the front and rear struts or rails 27, 29 is a tank supporting bar 41 which supports a liquid propane tank 43 thereon. At the bottom of the tank 43, there is a tank support collar 45 having notches 47 formed therein for receiving the tank support bar 41, in order to support the tank 43 in the position shown in FIGS. 1-2 of the drawings. At the top of the tank 43 is a hand operated tank valve 49 for attachment to the regulator 51, that is, in turn, connected to the hose 53 extending from the gas burner assembly (not shown) within the heating chamber receptacle 3.

The grill 1 is designed for use with either natural gas (NAT) or liquid propane (LP). Thus, the grill is supplied with either a connection for natural gas or a liquid propane tank 43. Natural gas is fed to the gas burner (not shown) within the heating chamber receptacle 3 by operation of the burner controls 19, while liquid petroleum evaporates into a gas inside of the tank 43 which is fed to the gas burner (not shown) within the heating chamber receptacle 3 by hand operated tank valve 49, then passing through the regulator 51, and operation of the burner controls 19. Both natural gas and liquid petroleum gas have had a long history of safe use, when simple rules are followed, and a liquid petroleum tank 43, suitably constructed for that purpose, is used.

Adjacent pairs of front and rear leg supports 23, 23 and 25, respectively, on opposite sides of grill 1 are provided with side shelf assemblies 55, 57. Also extending along the front of the grill 1 is a front shelf assembly 59 which extends between two front leg supports 23, 23. By comparing FIG. 1 and FIG. 2 of the drawings, it will be seen that the side shelf assembles 55, 57 and the front shelf assembly 59 are constructed to fold down in proximity to leg supports, for shipping and storage of the grill as shown in FIG. 2, and are also capable of being opened up to a horizontal position extending generally transverse to the leg supports 23, 23 and 25, 25, as shown in FIG. 1, for supporting various food products, condiments, utensils, etc. used during grilling. Note in this regard that the each of the side shelves 55, 57 are each provided with a series of adjacently positioned flat wood slats 61 which are mounted atop spaced vertically oriented facia boards 63, 63 at opposite ends thereof. The front shelf also includes closely positioned flat wood slats 65 and further includes a wire basket 67 which is connected to the wood slats 65 by the basket ends 69, 69. The wire basket 67 is useful as a handy condiment tray, as will be appreciated.

Figure 20:
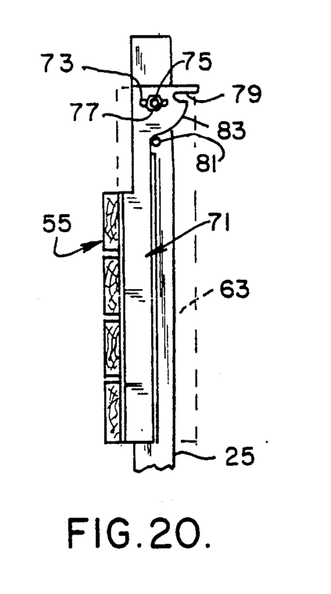
FIG. 20 is a fragmentary front elevational view of one of the side shelf of the grill in a folded down and collapsed position relative to one of the leg supports of the grill.
Figure 21:
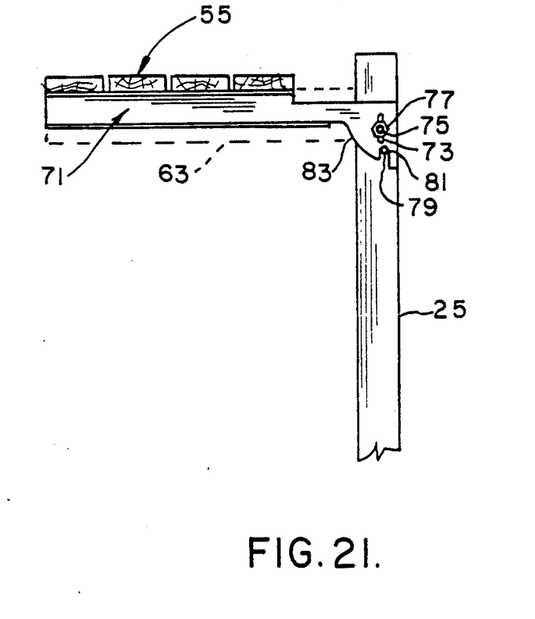
FIG. 21 is a fragmentary front elevational view of side shelve shown in FIG. 20, when moved to a horizontal position for use during grilling.

In order to move side shelves 55, 57 and the front shelf 59 from a folded down to and extended positioned, each of the shelves, at opposite ends thereof, are provided with a drop down shelf bracket, as best seen in FIGS. 20-21 of the drawings. In both of these figures, only a single drop down shelf bracket 71 for the left side shelf 55 is shown; however, it will be understood that each side shelf 55 and 57 are provided with two drop down shelf brackets 71, 71 which are positioned to extend immediately inside of the spaced vertically oriented facia boards 63, 63 and are connected thereto. In FIGS. 20-21 of the drawings, the facia board 63 is shown in dotted lines only in order that the construction of the drop down shelf bracket 71 may be understood. Further, it should be noted that the drop down shelf bracket 71 in FIGS. 20–21 of the drawings is mounted to the rear leg support 25.

In order to understand the operation of the drop down shelf brackets 71, for use with both the side shelves 55 and 57, as well as the front shelf 59, it will be seen that the end of the shelf bracket 71, which is attached to leg support 25, includes a slotted opening 73 which receives as threaded fastener 75 attached to the leg support 25, and having a threaded nut 76 for securing the drop down shelf bracket 71 to the rear leg support 25. The elongated slot 73 enables the side shelve 55, shown in FIGS. 20–21, to be moved from folded down position shown in FIG. 20 to the extending horizontal position shown in FIG. 21. Note in this connection that the slot 73 is moved from a horizontal to a vertically extending position with such shelf movement. Note further that the same end of the drop down shelf bracket 71 includes a notch 79, which is generally aligned with the slot 73, for receiving the lower stud 81 extending from the rear leg support 25, the stud 81 also being aligned with the stud 75 received by the elongated slot 73. When moving the side shelf 55 from the folded down vertical position shown in FIG. 20 to the extended and horizontal position shown in FIG. 21, the camming surface 83 on the lower edge of the bracket 71, adjacent the notch 79, facilitates movement of the stud 81 from a position shown in FIG. 20 to the FIG. 21 illustration where the stud 81 is received within the notch 79. Thus, the cam surface 83, as it engages the stud 81, participates in moving the side shelf 55 from the folded down to the extending to the extended and horizontal position shown FIG. 21.

Since each pair of drop down shelf brackets 71 associated with each side shelf 55 and 57, as well as the front shelf 59, operates in the same manner as described above, further description of the construction and operation relative to such other shelves is unnecessary.

Figure 15:
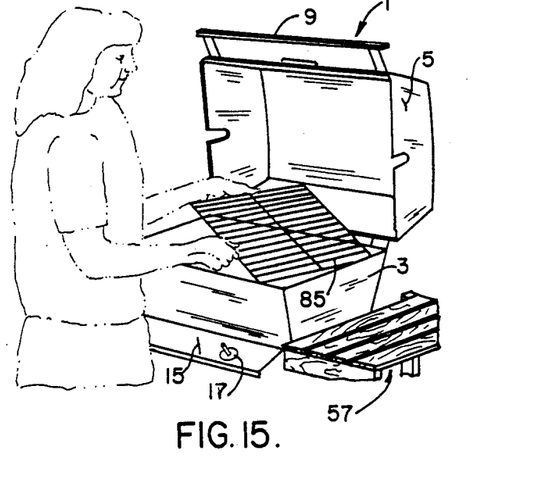
FIG. 15 is a fragmentary front perspective view of the grill with the female consumer in phantom lines showing the installation of the rock grate and cooking grid of the grill.
Figure 16:
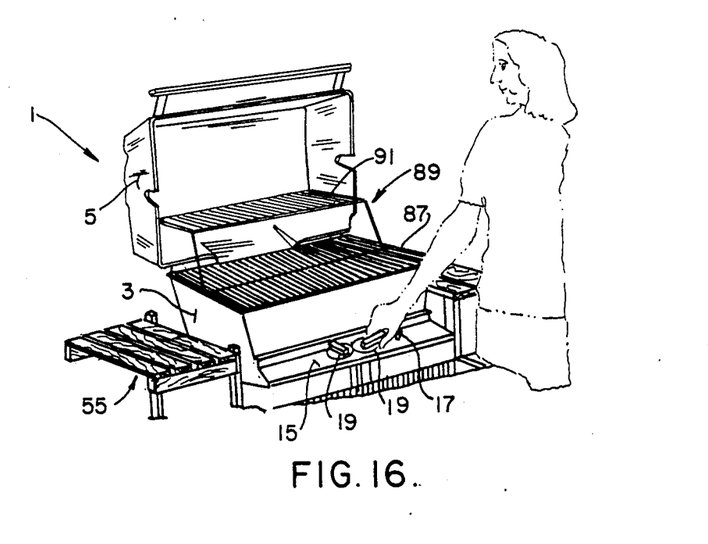
FIG. 16 is a fragmentary front perspective view of the grill, following assembly of all components including the warming rack, and showing the female consumer in phantom lines igniting and operating the burner controls for use and operation of the grill.

As shown in FIGS. 15–16, the grill 1 is provided with a rock grate 85 that fits within and adjacent the bottom of the heating chamber receptacle 3. The rock grate 85 is shown as being installed by a female consumer in phantom lines in FIG. 15 of the drawings. Suitable rocks (not shown) are placed on the rock grate 85, preferably western lava rock for vaporizing meat drippings for a barbeque flavor.

In FIG. 16 of the drawings, a cooking grid 87 is shown as being mounted atop the heating chamber receptacle 3. Also, FIG. 16 shows a swing away warming rack 89 which is attached to both the heating chamber receptacle 3 and the dome cover 5 to maintain the grid section 9 thereof in horizontal position during both opening and closing of the dome cover 5 relative to the heating chamber receptacle 3.

Figure 17:
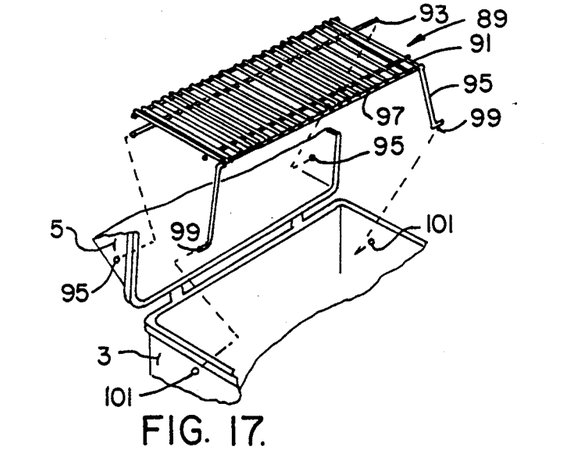
FIG. 17 is an exploded fragmentary perspective view illustrating the manner in which the warming rack is mounted to the domed cover and heating chamber receptacle of the grill.
Figure 18:
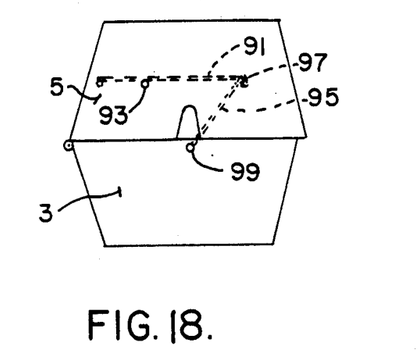
FIG. 18 is a side elevational view of the domed cover in closed position above the heating chamber receptacle of the grill, and illustrating the warming rack in dotted lines in a horizontal position within the grill.
Figure 19:
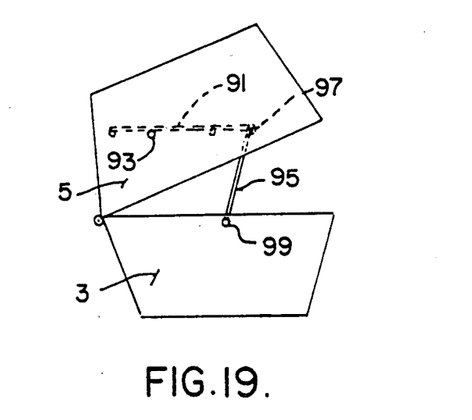
FIG. 19 is a side elevational view illustrating the domed cover being opened relative to the heating chamber receptacle of the grill, and illustrating the manner in which the warming rack is maintained in a horizontal position during opening of the grill.

In this connection, reference is made to FIG. 17–19 of the drawings for a specific illustration of the construction and operation of the swing away warming rack 89. The grid section 91 of the warming rack 89 includes rod 93 which extends beyond the grid section 91 at opposite ends thereof for engagement within holes 95, 95 in the domed cover 5. At the other end of the grid section 91, a swinging bar 95 includes a rod 97 which is pivotally mounted to the grid section 91 and includes outwardly directed fingers 99, 99 at a lower end thereof for reception within the holes 101, 101 of the heating chamber receptacle 3, on opposite sides thereof, all of which is shown in FIG. 17 of the drawings.

When the domed cover 5 is closed relative to the receptacle 3, as shown in FIG. 18 of the drawings, the grid section 91 is shown as being mounted in the horizontal position. The grid section 91 is always maintained in a horizontal position, even when the lid is opened, as shown in FIG. 19 of the drawings, because the swinging bar 95 pivots both about the lower fingers 99 relative to the heating chamber receptacle 3 as well as the rod 97 relative to the grid section 91, so as to always maintain the grid section 91 in a horizontal position. As will be appreciated, this is important since any meat resting upon the grid section 91 will also be maintained in a horizontal position, while the meat is spaced upwardly from the cooling grid 97.

Having now described many of the components and operating parts of the grill 1, attention is now focused on that part of the gas barbeque grill 1 which comes pre-assembled, including the method of shipping and setting up the pre-assembled grill. In this specific connection, reference is now made to FIGS. 3–16 of the drawings for a description of the manner in which the pre-assembled gas barbeque grill 1 is shipped, and the steps which are necessary to fully assemble the grill as shown in FIGS. 1–2 of the drawings.

Figures 3, 4A:
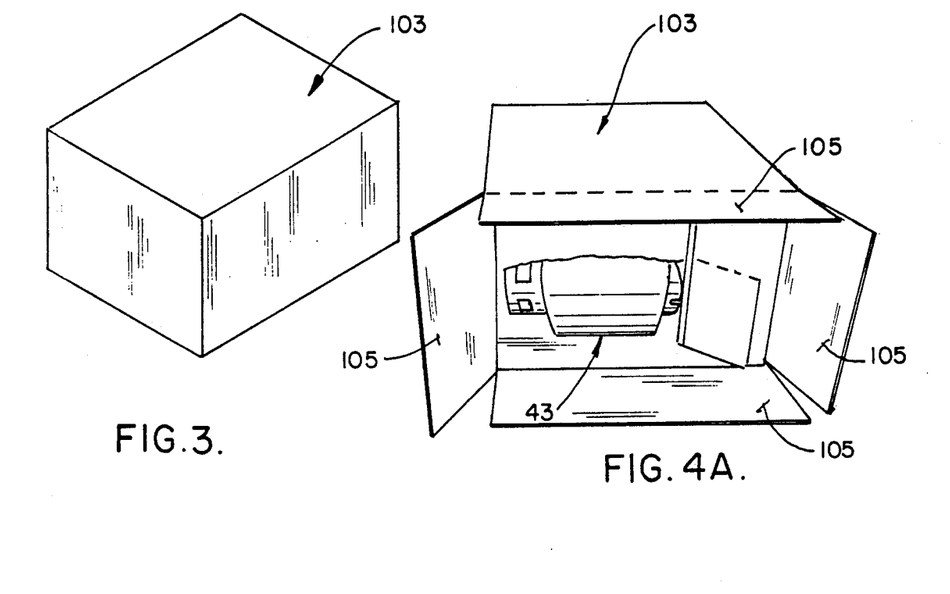
FIG. 3 is a perspective view of the shipping carton containing the pre-assembled gas barbeque grill during shipping.
FIG. 4a is a perspective view of the shipping carton containing the pre-assembled gas barbeque grill, with one end thereof opened to expose a liquid propane tank for removal from the shipping carton, without removing the pre-assembled gas barbeque grill.
Figure 4B:
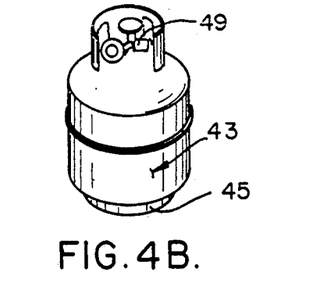
FIG. 4b is a perspective view of a liquid propane tank removed from the shipping carton to permit filing of propane gas prior to arrival at the consumers home.
Figure 5:
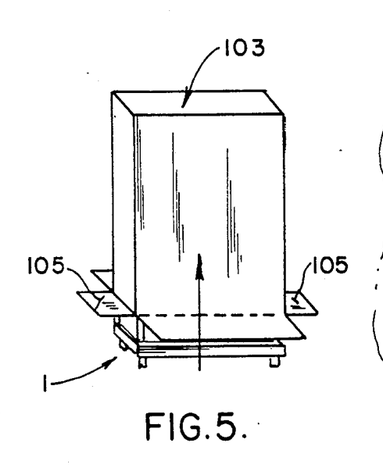
FIG. 5 is a perspective view of the shipping carton which shows the leg supports of the grill resting on a supporting surface, to enable the shipping carton to be lifted up and away from the grill.

In FIG. 3 of the drawings, the shipping carton 103 used to ship the pre-assembled gas barbeque grill 1 is shown. FIG. 4a of the drawings illustrates one end of the shipping carton 103 being opened to expose the liquid propane tank 43 at one end thereof. The tank 43 may be removed from the shipping carton 103 without removing the pre-assembled grill 1 for gas filling of the tank 43 by a user prior to arrival at the user's home. This is represented by FIG. 4b of the drawings where tank 43 has been removed from the shipping carton 103, thus permitting the user to have the same filled before arriving home where the pre-assembled barbeque grill 1 will be set-up.

Once the consumer or user arrives at their home, the pre-assembled gas barbeque grill 1 can be removed from the shipping carton 103. Preferably, this is accomplished by folding the flaps 105 at the open end of the shipping carton 103 including folding the bottom flap under the shipping carton 103. Thereafter, while holding the leg supports of the grill 1 to prevent it from sliding out of the shipping carton 103 prematurely, the shipping carton is moved from the position shown in FIG. 4a to that illustrated in FIG. 5. This enables the user to simply slide and lift the shipping carton 103 up and away from the grill 1.

Figure 6:
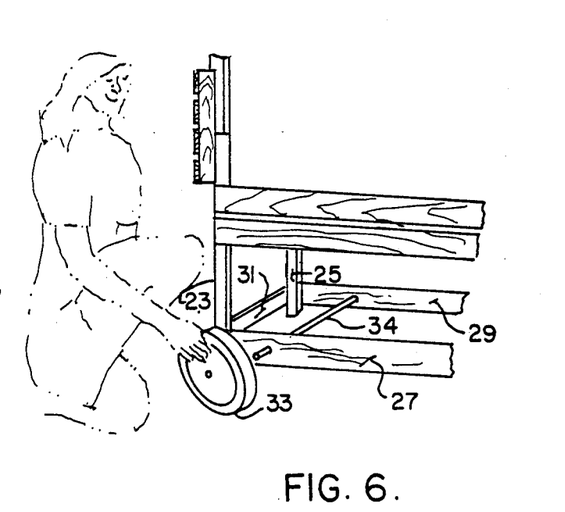
FIG. 6 is a fragmentary front perspective view of part of the gas barbeque grill illustrating a female consumer in phantom lines installing the axle and wheels on the gas barbeque grill.

Following removal of the shipping carton 103 from the grill 1, the user, shown in the drawings as a female consumer in phantom lines, can mount the wheels 33, 33 on the wheel axle 34. Also, the casters 35, 35 can be inserted in the open bottom end of the front and rear leg supports 23, 25, on an end of the grill 1 opposite from the wheels 33, 33.

Figure 7:
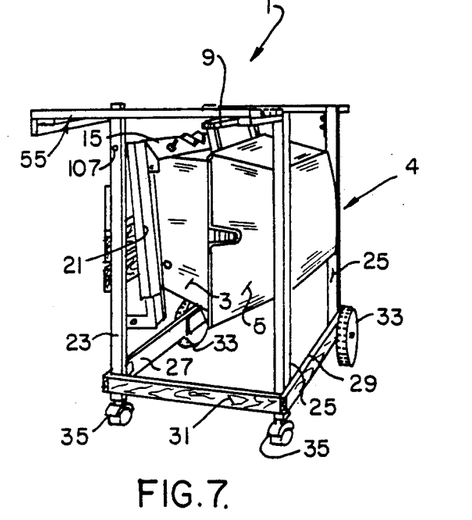
FIG. 7 is a side perspective view of the pre-assembled gas barbeque grill, with the grill itself being suspended in a lower pivot position between the four leg supports of the grill, following removal of the grill from the shipping carton.

The next step in setting up the pre-assembled grill 1 15 shown in FIGS. 7–13 of the drawings. In FIG. 7 of the drawings, the grill housing 4 including the heating chamber receptacle 3 and the domed cover 5, are shown as being suspended within the four spaced front and rear leg supports 23, 23 and 25, 25, respectively. This suspended or collapsed condition results from the pivotal mounting of the grill housing 4 to the elongated struts 21, 21, on opposite sides of the heating chamber receptacle 3, as at 107 proximate an upper end of the two front leg supports 23, 23, as shown in FIGS. 7–10 of the drawings. As a result, the grill housing 4 is suspended from the two front leg supports 23, 23 at 107, 107 in each case, in the lower pivot position between the four leg front and rear leg supports 23, 23 and 25, 25 as shown in FIG. 7. As will be appreciated, this provides a more compact grill for shipping within the shipping carton 103, while protecting the heating chamber receptacle 3, domed cover 5 including all associated components within the leg supports 23, 23 and 25, 25.

It should be noted that there is sufficient space between the bottom of the heating chamber receptacle 3 and the bottom of the front and rear leg supports 23, 23 and 25, 25 for receipt of the tank 43, when placed in the shipping carton 103, at one end thereof. Additional components of the grill 1, such as the wheels 33, axle 34 and other parts may be placed around the heating chamber receptacle 3 and the domed cover 5 within the shipping carton 103, while a rock grate 85, cooking grid 87 and swing away warming rack 89 may be contained, for example, within the closed heating chamber receptacle 3 and dome cover 5.

Figure 8:
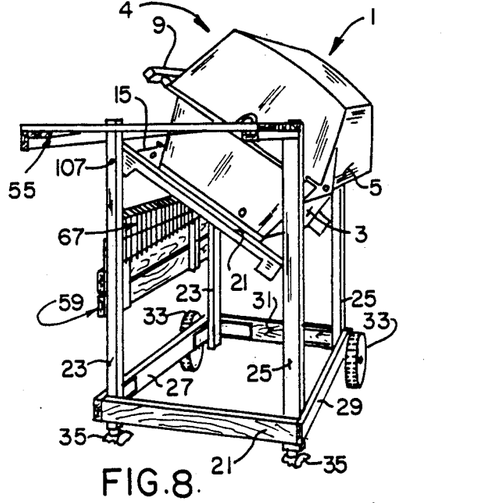
FIG. 8 is a side perspective view of the pre-assembled gas barbeque grill illustrating the manner in which the grill is subsequently pivoted to an upper horizontal position, the grill in FIG. 8 being moved approximately half the distance between the lower pivot position of FIG. 7 and the full position shown in FIGS. 1-2.
Figures 9, 10, 11:
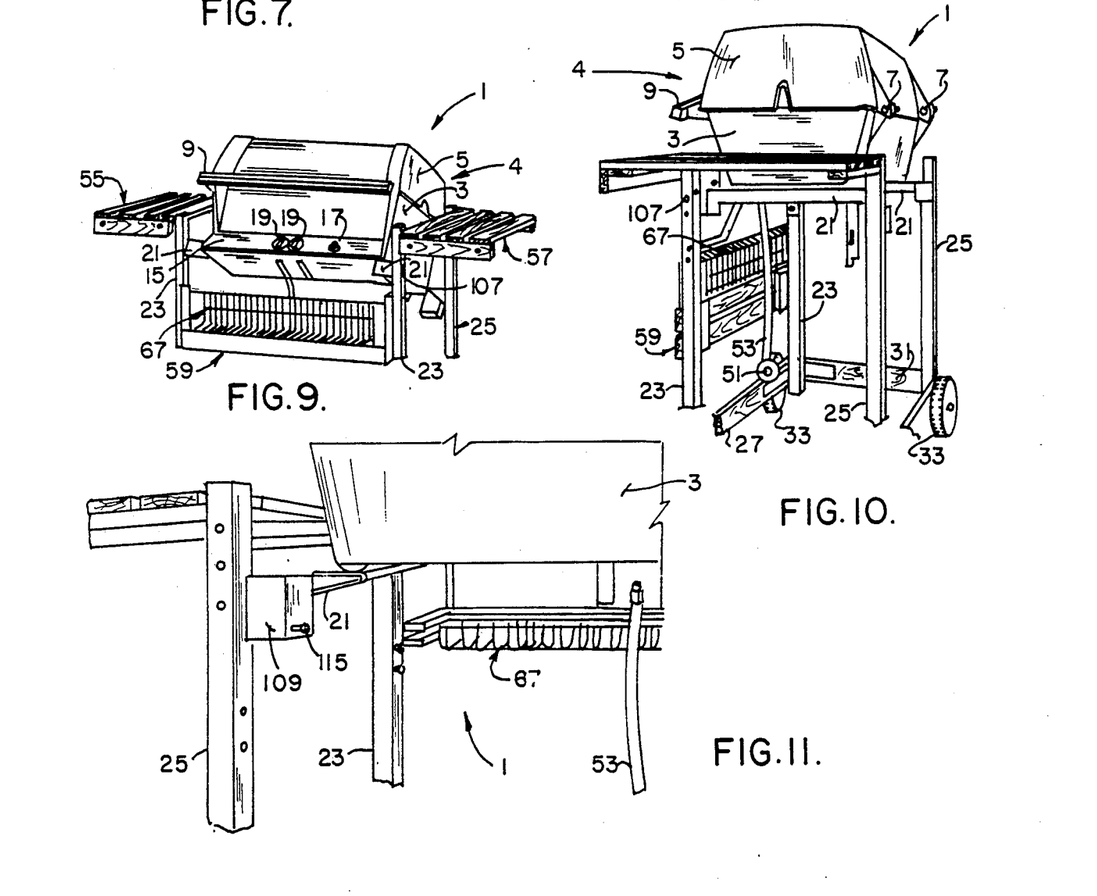
FIG. 9 is a fragmentary front perspective view showing the grill being moved to its upper horizontal position and being located in approximately the same position as that seen in the side perspective view of FIG. 8.
FIG. 10 is a fragmentary side perspective view of the pre-assembled gas barbeque grill, with the grill itself being secured in a horizontal position, for operation and use thereof.
FIG. 11 is an enlarged fragmentary rear perspective view illustrating the manner in which the grill is secured in its upper horizontal position.
Figure 12:
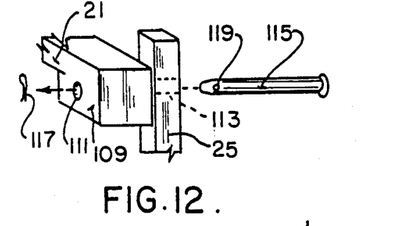
FIG. 12 is a fragmentary exploded rear perspective view specifically illustrating the fastening technique by which the grill is secured to the rear leg supports in an upper horizontal position.
Figure 13:
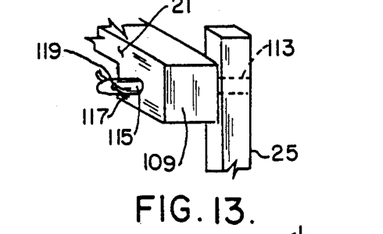
FIG. 13 is a fragmentary rear perspective view similar to FIG. 12 and further illustrating the fastening technique by which the grill is pinned and secured to the rear leg supports in an upper horizontal position.
Figure 14:
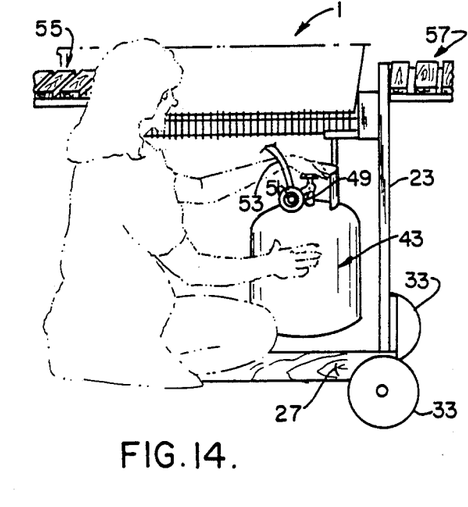
FIG. 14 is a fragmentary front perspective view illustrating the female consumer in phantom lines installing the tank, hose, regulator and lower shelf of the grill.

As shown in FIGS. 8-9, the grill housing 4, including the heating chamber receptacle 3 and domed cover 5, are pivoted from the lower pivot position shown in FIG. 7 the horizontal position shown in FIG. 10 and secured in place to the leg supports 25, 25. Specifically, at the opposite end from the pivots 107 each elongated strut 21 is provided with an enlarged end portion 109 and a hole 111 therein. An associated rear leg support 25 is provided with a hole 113, for alignment with the hole 111, in enlarged end 109 of the elongated strut 21, for receipt of the hinge pin 115 therein. Following insertion of the hinge pin 115 within the aligned holes 111, 113, as shown in FIG. 13 of the drawings, a retainer clip 117 is threaded through a small hole 119 at the pointed end of the hinge pin 115, for retaining the hinge pin 115 in position. As a result, the grill housing 4 is held in a stable and secure horizontal position as shown in FIG. 10 of the drawings. After the grill housing 4 is moved to its horizontal position, the tank 43 may be connected to the regulator 51 and hose 53 as shown in FIG. 14 of the drawings. Shortly thereafter, the lower shelf 37 may be installed, as described above.

The next step in the setting up process is shown in FIG. 15 of the drawings where the rock grate 85 is installed in the heating chamber receptacle 3 to enable rock pieces (not shown) to be positioned thereon. Thereafter, the cooking grid 87 and the warming rack 89 ma be installed relative to the heating chamber receptacle 3 and dome cover 5, also as previously described.

Following completion of the above steps, the gas burner (not shown) within the heating chamber receptacle 3 may be ignited by the igniter 17, and the gas burner controls 19 operated to enable the consumer to enjoy cooking of their favorite meat or food product, as shown in FIG. 16 of the drawings.

From the foregoing, it will be appreciated that the pre-assembled gas barbeque grill achieves the several objects and advantages of the present invention.

As various changes could be made in the above constructions and methods without departing from the scope of the invention, it is intended that all matter contained in the above description or shown in the accompanying drawings shall be interpreted as illustrative and not in a limiting sense.

What is claimed:

1. A barbeque grill including leg support means attached to and supporting a grill housing, said grill housing being movable to a collapsed position relative to said leg support means for shipping and also being movable to an extended position relative to said leg support means during operation and use of said barbeque grill, said leg support means including a plurality of spaced fixed leg supports arranged and supported relative to one another in a predetermined peripheral fixed array, said grill housing having a peripheral dimension smaller than the predetermined peripheral fixed array of spaced fixed leg supports, means pivotally mounting said grill housing relative to said spaced fixed leg supports so as to be received within the predetermined peripheral array of spaced fixed leg supports when the grill housing is collapsed in a lower pivot position, and means fixedly securing said grill housing in an upper horizontal position relative to said spaced fixed leg supports during operation and use of said grill.

2. The barbeque grill as defined in claim 1 wherein said grill housing is pivotally mounted to said leg support means adjacent an upper end of some of said spaced leg supports.

3. A barbeque grill including a plurality of spaced fixed leg supports arranged and supported relative to one another in a predetermined fixed peripheral array for supporting a grill housing smaller in peripheral dimension than the predetermined peripheral array of spaced fixed leg supports, said grill housing being pivotally mounted proximate an upper end to at least one of said spaced fixed leg supports to enable said grill housing to be suspended from said at least one of said spaced fixed leg supports in a lower pivot position within the predetermined peripheral array of spaced fixed leg supports during shipping, said grill housing being subsequently pivoted to an upper horizontal position and means for fixedly securing said grill housing to at least one other leg support also proximate an upper end thereof in general horizontal alignment with the pivotal mounting on said at least one of said spaced fixed leg supports, in order to maintain said grill housing in a stable and secure horizontal position during operation and use thereof.

4. A barbeque grill including four spaced fixed leg supports arranged and supported relative to one another in a rectangular pattern for supporting a grill housing smaller in peripheral dimension than the rectangular pattern of four spaced fixed leg supports, means pivotally mounting said grill housing proximate an upper end of two of said spaced fixed leg supports along one side of and within said rectangular pattern of said four spaced fixed leg supports, said grill housing being dimensioned to fit within said rectangular pattern of said four spaced fixed leg supports to enable said grill housing to be suspended from said two spaced fixed leg supports in a lower pivot position between said four spaced fixed leg supports during shipping, said grill housing being subsequently pivoted to an upper horizontal position and means for fixedly securing said grill housing substituted to said outer two spaced fixed leg supports also proximate an upper end thereof in general horizontal alignment with the pivotal mounting on said other spaced fixed leg supports, in order to maintain said grill housing in a stable and secure horizontal position during operation and use thereof.

5. In a barbeque grill including leg support means attached to and supporting a grill housing, the improvement comprising: said grill housing being movable to a collapsed position relative to said leg support means for shipping and also being movable to an extended position relative to said leg support means during operation and use of said barbeque grill, said leg support means including a plurality of spaced fixed leg supports arranged and supported relative to one another in a predetermined fixed peripheral array, said grill housing being smaller in peripheral dimension than the predetermined peripheral array of spaced fixed leg supports, means pivotally mounting said grill housing relative to said spaced fixed leg supports to be received within the predetermined peripheral array of spaced fixed leg supports when the grill housing is collapsed in a lower pivot position, and said grill housing being pivotally movable to and means fixedly securing said grill housing in an upper horizontal position relative to said spaced fixed leg supports during operation and use of said grill.

6. In a barbeque grill having four spaced fixed leg supports arranged and supported relative to one another in a rectangular pattern for supporting a grill housing, the improvement comprising: said grill housing having a smaller peripheral dimension than the predetermined peripheral array of spaced fixed leg supports, pivotally mounting said grill housing along one side of said rectangular pattern of four spaced fixed leg supports to two spaced fixed leg supports proximate an upper end of said two leg supports to enable said grill housing to be suspended in a lower pivot position between said four spaced fixed leg supports during shipping, said grill housing being subsequently pivoted to an upper horizontal position and being secured to said two other spaced fixed leg supports proximate an upper end thereof in general horizontal alignment with the pivotal mounting on said other spaced fixed leg supports, so as to maintain said grill housing in a stable and secure horizontal position during operation and use thereof.

7. In a barbeque grill having four spaced fixed leg supports arranged and supported relative to one another in a rectangular pattern for supporting a grill housing, the improvement comprising: said grill housing having a peripheral dimension smaller than the rectangular pattern of spaced fixed leg supports, pivotally mounting said grill housing to certain of said spaced fixed leg supports proximate an upper end thereof to enable said grill housing to be suspended in a lower pivot position between said four spaced fixed leg supports during shipping, said grill housing being subsequently pivoted to an upper horizontal position, and means for securing said grill housing in a fixed position relative to said spaced fixed leg supports proximate an upper end thereof, so as to maintain said grill housing in a stable and secure horizontal position during operation and use thereof.

8. A barbeque grill including four spaced fixed leg supports arranged and supported relative to one another in a rectangular pattern for supporting a grill housing, said grill housing having a peripheral dimension smaller than the rectangular pattern of spaced fixed leg supports, means pivotally mounting said grill housing between some of said spaced fixed leg supports proximate an upper end thereof to enable said grill housing to be suspended from its pivotal mounting in a lower pivot position between said four spaced fixed leg supports during shipping, said grill housing being subsequently pivoted to an upper horizontal position and means for securing said grill housing in a fixed position relative to said four spaced fixed leg supports also proximate an upper end thereof in order to maintain said grill housing in a stable and secure generally horizontal position during operation and use thereof.

9. The barbeque grill as defined in claim 8 wherein the four spaced leg supports with the included grill housing are suspended in a lower pivot position within said leg supports and positioned inside a shipping carton.

10. The barbeque grill as defined in claim 9 wherein a liquid propane tank is also positioned inside said shipping carton within said leg supports at one end of said shipping carton, whereby said tank may be easily removed and filled by a user without removing the grill from the shipping carton.

11. The barbeque grill as defined in claim 10 wherein adjacent pairs of leg supports on opposite sides of and along the front of the grill are provided with shelves that are constructed to fold down in proximity to said leg supports for shipping and storage of said grill and include means so that they may be opened up to a horizontal position extending generally transverse to said leg supports for supporting various products used during grilling.

12. The barbeque grill as defined in claim 1 wherein the spaced leg supports to which the grill housing is pivotally mounted are located along one long side of a rectangular pattern of four spaced leg supports.

13. The barbeque grill as defined in claim 12 wherein the grill housing is fixedly secured to other leg supports along another side of said rectangular pattern by a pin which extends through an aligned opening in each said other leg support and part of said grill on opposite sides thereof.

14. The barbeque grill as defined in claim 13 wherein the grill housing is supported by an elongated strut on at least two opposite sides, one end of each elongated strut being pivotally mounted to leg supports which pivotally mount said grill housing, and the other end of each said elongated strut being secured to two other leg supports by a pin which extends through aligned openings in each said other leg support and one of said elongated struts.

15. The barbeque grill as defined in claim 14 wherein the elongated struts on at least two opposite sides of said grill housing are interconnected to one another by a transverse strut extending therebetween and connected to said grill.

16. The barbeque grill as defined in claim 15 wherein said transverse strut extends along the front of said grill housing and includes controls for operating the flow of gas to a gas burner contained within the grill.

17. The barbeque grill as defined in claim 1 wherein at least one adjacent pair of spaced leg supports are provided with shelf that includes means so that it may fold down in proximity to said leg supports for storage during non-use of said grill and also capable of being opened up to a horizontal position extending transverse to said leg supports for supporting various products used during grilling.

18. The barbeque grill as defined in claim 17 wherein there are two said shelves provided on opposite sides of said grill and an additional shelf provided on the front side of said grill.

19. A barbeque grill as defined in claim 1 and wherein said grill housing includes a heating chamber, a grid mounted atop said heating chamber on which food can be placed for cooking, a domed cover pivotally mounted to said heating chamber between an open position for placing food on said grid and a closed position where the domed cover overlies the grid and heating chamber of said grill, and a warming rack pivotally mounted to both said domed cover and heating chamber between an upper position spaced a predetermined distance from said grid when the domed cover is in an open position and a lower position substantially less than said predetermined distance when the domed cover is in a closed position overlying the grid and hearing chamber of said grill.

20. The barbeque grill as defined in claim 19 wherein the warming rack includes a grid section pivotally mounted adjacent one side thereof to said domed cover and pivotally mounted along an opposite side to a swinging bar at its upper end, said swinging bar also being pivotally mounted at its lower end to said heating chamber so as to maintain said grid section in a horizontal position during both opening and closing of said domed cover relative to said heating chamber.

* * * * *